United States Patent
Silberstein et al.

(10) Patent No.: US 10,815,436 B2
(45) Date of Patent: *Oct. 27, 2020

(54) COIL-WOUND HEAT EXCHANGER FOR HYDROTREATMENT OR HYDROCONVERSION

(71) Applicant: AXENS, Rueil-Malmaison (FR)

(72) Inventors: Claire Silberstein, Asnieres sur Seine (FR); Odile Lajeunesse, Rueil-Malmaison (FR); Jacques Rault, Paris (FR); Marielle Gagniere, Chatou (FR)

(73) Assignee: AXENS, Rueil-Malmaison (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,606

(22) Filed: Dec. 20, 2018

(65) Prior Publication Data
US 2019/0194552 A1 Jun. 27, 2019

(30) Foreign Application Priority Data
Dec. 22, 2017 (FR) ..................... 17 62993

(51) Int. Cl.
*C10G 45/22* (2006.01)
*C10G 49/00* (2006.01)
(Continued)

(52) U.S. Cl.
CPC .......... *C10G 45/22* (2013.01); *B01J 19/0013* (2013.01); *C10G 45/00* (2013.01); *C10G 47/00* (2013.01);
(Continued)

(58) Field of Classification Search
CPC ........ C10G 45/00; C10G 45/22; C10G 47/00; C10G 49/00; C10G 67/02; B01J 19/0013; F28D 7/024
See application file for complete search history.

(56) References Cited

U.S. PATENT DOCUMENTS

| 1,949,632 A | 3/1934 | Russell |
| 2011/0174687 A1* | 7/2011 | Reynolds ................. B01J 27/04 208/100 |

(Continued)

FOREIGN PATENT DOCUMENTS

| EP | 3184607 B1 | 12/2018 |
| GB | 348690 A | 5/1931 |

(Continued)

OTHER PUBLICATIONS

Chen, Y.D. et al. (2015) Procedia Engineering, 130, 286-297.*
Search report in corresponding FR 1762993 dated Jun. 14, 2018 (pp. 1-8).

*Primary Examiner* — Brian A McCaig
(74) *Attorney, Agent, or Firm* — Millen White Zelano and Branigan, PC; Csaba Henter

(57) ABSTRACT

The present invention relates to a device and a process for hydroconversion or hydrotreatment of a hydrocarbon feedstock, comprising in particular at least one coil-wound heat exchanger (S-1), said coil-wound exchanger being a single-pass heat exchanger formed by a vertical chamber in which one or more bundles of tubes are helically wound around a central core, as numerous superposed layers, for: heating and directly distributing a hydrocarbon feedstock/hydrogen stream mixture to a hydrotreatment or hydroconversion reaction section (R-1), and cooling the reaction effluent from the hydrotreatment or hydroconversion reaction section (R-1). The present invention also relates to a use of a coil-wound heat exchanger (S-1) in a process for hydroconversion or hydrotreatment of a hydrocarbon feedstock.

15 Claims, 3 Drawing Sheets

(51) Int. Cl.
*C10G 45/00* (2006.01)
*B01J 19/00* (2006.01)
*C10G 47/00* (2006.01)
*C10G 67/02* (2006.01)
*F28D 7/02* (2006.01)
*F28D 21/00* (2006.01)

(52) U.S. Cl.
CPC ............ *C10G 49/00* (2013.01); *C10G 67/02* (2013.01); *F28D 7/024* (2013.01); *B01J 2219/00054* (2013.01); *C10G 2300/1059* (2013.01); *C10G 2300/301* (2013.01); *C10G 2300/4006* (2013.01); *F28D 2021/0059* (2013.01)

(56) References Cited

U.S. PATENT DOCUMENTS

| | | |
|---|---|---|
| 2011/0272123 A1 | 11/2011 | Avis |
| 2015/0198373 A1* | 7/2015 | Zhang ...................... F28F 9/02 165/154 |
| 2017/0183574 A1 | 6/2017 | Odile |

FOREIGN PATENT DOCUMENTS

| | | |
|---|---|---|
| GB | 360530 A | 11/1931 |
| GB | 377938 A | 8/1932 |
| WO | 2011002429 A1 | 1/2011 |

* cited by examiner

COIL-WOUND HEAT EXCHANGER FOR HYDROTREATMENT OR HYDROCONVERSION

TECHNICAL FIELD

The present description relates to the field of devices and processes for hydroconversion (e.g. hydrocracking of heavy feedstocks) and hydrotreatment (e.g. hydrodemetallization, hydrodenitrogenation and/or hydrodesulfurization of residue or of gas oil).

PRIOR ART

Shell and tube heat exchangers have been known for a long time. Patents U.S. Pat. No. 2,978,226, EP 1 113 238 and EP 2 975 353 describe examples of heat exchangers of this type. Well-known shell and tube heat exchangers are for example the heat exchanges of the BEU or DEU standard which comprises bundles of exchange tubes in a U-shape (U-tube bundle). These standards are defined by the Tubular Exchanger Manufactures Association (TEMA; wwww-.tema.org).

Coil-wound heat exchangers, also referred to as spiral-wound heat exchangers, are known to a person skilled in the art. Thus, patent EP 1367350 describes a coil-wound heat exchanger and the use thereof in an LNG liquefaction process. Other configurations of coil-wound heat exchangers are for example described in patent applications WO 2004/063655 and WO 2014/067223.

The use of coil-wound heat exchangers has been envisaged, in the same way as other heat exchangers, in various processes such as for example processes for converting heavy feedstocks (U.S. Pat. Nos. 8,152,994 and 8,277,637) or cryogenic air separation processes (U.S. Pat. No. 6,718,79), without however this use leading to a modification of the layout compared to the case where other types of heat exchanger (shell and tube or plate heat exchangers for example) are used.

SUMMARY

Within the context described above, a first objective of the present description is to improve the hydroconversion or hydrotreatment devices and processes, especially in terms of energy efficiency and operating cost.

According to a first aspect, the aforementioned objective, and also other advantages, are obtained by a device for hydroconversion or hydrotreatment of a hydrocarbon feedstock, comprising:

at least one coil-wound heat exchanger, said coil-wound exchanger being a single-pass heat exchanger formed by a vertical chamber in which one or more bundles of tubes are helically wound around a central core, as numerous superposed layers, suitable for:
  heating and directly distributing the hydrocarbon feedstock and optionally a hydrogen stream or a hydrocarbon feedstock/hydrogen stream mixture to a hydrotreatment or hydroconversion reaction section, and
  cooling the reaction effluent from the hydrotreatment or hydroconversion reaction section;
a first mixing section suitable for mixing the hydrocarbon feedstock with the hydrogen stream, it being possible for said first mixing section to lie upstream or downstream of the at least one coil-wound heat exchanger;
the hydrotreatment or hydroconversion reaction section suitable for hydrotreating or hydroconverting the hydrocarbon feedstock;
a high-pressure cold separator suitable for separating at least one portion of the cooled reaction effluent into a first liquid effluent comprising at least one light fraction and a first gaseous effluent comprising hydrogen; and
a separation column suitable for separating the first liquid effluent comprising at least one light fraction into a bottoms liquid and an overhead effluent.

According to one or more embodiments, the device further comprises a first compression section suitable for compressing and recycling the first gaseous effluent comprising hydrogen to the first mixing section or the at least one coil-wound heat exchanger.

According to one or more embodiments, the hydrotreatment or hydroconversion reaction section comprises at least one reactor comprising at least one catalyst comprising at least one element chosen from elements from Group VIII of the Periodic Table.

According to one or more embodiments, the reactor comprises at least one fixed bed.

According to one or more embodiments, the reactor comprises at least one bubbling bed.

According to one or more embodiments, the device comprises a device for filtering the hydrocarbon feedstock at the inlet of the unit. According to one or more embodiments, the filtration device is located downstream of an optional heat exchanger suitable for heating the hydrocarbon feedstock to a temperature between 50° C. and 100° C. or between 150° C. and 230° C.

According to one or more embodiments, the device comprises a feedstock drum suitable for containing the optionally filtered hydrocarbon feedstock. Said drum being located upstream of a pump for feeding the coil-wound heat exchanger S-1.

According to one or more embodiments, the device comprises a single coil-wound heat exchanger.

According to one or more embodiments, the device further comprises a first bypass suitable for directly distributing a portion of the hydrocarbon feedstock or a portion of the hydrocarbon feedstock/hydrogen stream mixture from the inlet of the coil-wound heat exchanger to the outlet of the coil-wound heat exchanger.

According to one or more embodiments, the device further comprises a high-pressure hot separator suitable for separating the cooled reaction effluent into a first liquid effluent comprising at least one heavy fraction and a first gaseous effluent comprising a light fraction distributed to the high-pressure cold separator.

According to one or more embodiments, the device further comprises a medium-pressure hot separator suitable for separating the first liquid effluent comprising at least one heavy fraction into a second liquid effluent comprising at least one heavy fraction distributed to the separation column, and a second gaseous effluent comprising a light fraction.

According to one or more embodiments, the device further comprises a medium-pressure cold separator suitable for separating the first liquid effluent comprising at least one light fraction into a second liquid effluent comprising at least one light fraction distributed to the separation column, and a second gaseous effluent comprising hydrogen.

According to one or more embodiments, the medium-pressure cold separator is suitable for separating the second gaseous effluent comprising a light fraction.

According to one or more embodiments, the hydrotreatment or hydroconversion reaction section is suitable for directly distributing the reaction effluent to the coil-wound heat exchanger.

According to one or more embodiments, the device further comprises at least a second heat exchanger and/or a steam generator and/or a first air condenser which are suitable for cooling and/or condensing the first gaseous effluent comprising a light fraction, respectively.

According to one or more embodiments, the device further comprises an amine washing column suitable for eliminating at least a portion of the $H_2S$ from the first gaseous effluent comprising hydrogen.

According to one or more embodiments, the device further comprises a second air condenser suitable for condensing the second gaseous effluent comprising a light fraction and distributing the condensed second gaseous effluent comprising a light fraction to the medium-pressure cold separator.

According to one or more embodiments, the device further comprises a third heat exchanger suitable for heating the first or second liquid effluent comprising at least one light fraction and/or cooling the bottoms liquid from the separation column.

According to one or more embodiments, the device further comprises a fourth heat exchanger suitable for cooling or heating the first or second liquid effluent comprising at least one heavy fraction.

According to one or more embodiments, the device further comprises a third air condenser suitable for condensing the overhead effluent from the separation column.

According to one or more embodiments, the device further comprises a reflux drum suitable for separating the overhead effluent from the separation column into an overhead gaseous fraction and at least one hydrocarbon liquid cut.

According to a second aspect, the aforementioned objective, and also other advantages, are obtained by a process for hydroconversion or hydrotreatment of a hydrocarbon feedstock, comprising the following steps:
  heating and directly distributing the hydrocarbon feedstock and optionally a hydrogen stream or a hydrocarbon feedstock/hydrogen stream mixture to a hydrotreatment or hydroconversion reaction section by means of at least one coil-wound heat exchanger, said coil-wound exchanger being a single-pass heat exchanger formed by a vertical chamber in which one or more bundles of tubes are helically wound around a central core, as numerous superposed layers;
  mixing the hydrocarbon feedstock with the hydrogen stream in a first mixing section, it being possible for said mixing to take place before or after the heating step; cooling the reaction effluent from the hydrotreatment or hydroconversion reaction section by means of the at least one coil-wound heat exchanger;
  hydrotreating or hydroconverting the hydrocarbon feedstock in the hydrotreatment or hydroconversion reaction section comprising at least one reactor comprising at least one catalyst comprising at least one element chosen from elements from Group VIII of the Periodic Table;
  separating at least one portion of the cooled reaction effluent in a high-pressure cold separator in order to distribute a first liquid effluent comprising at least one light fraction and a first gaseous effluent comprising hydrogen; and
  separating the first liquid effluent comprising at least one light fraction in a separation column in order to distribute a bottoms liquid and an overhead effluent.

According to one or more embodiments, the process further comprises compressing and recycling the first gaseous effluent comprising hydrogen to the first mixing section or the at least one coil-wound heat exchanger by means of a first compression section.

According to one or more embodiments, the hydrotreatment or hydroconversion of the hydrocarbon feedstock is carried out under hydrotreatment or hydroconversion conditions, such as at least one of the following operating conditions:
  the temperature is between around 200° C. and around 460° C.;
  the total pressure is between around 1 MPa and around 20 MPa;
  the overall hourly space velocity of liquid feedstock is between around 0.05 $h^{-1}$ and around 12 $h^{-1}$;
  the hydrogen stream comprises between around 50 vol % and around 100 vol % of hydrogen relative to the volume of the hydrogen stream;
  the amount of hydrogen relative to the liquid hydrocarbon feedstock is between around 50 $Nm^3/m^3$ and around 2500 $Nm^3/m^3$.

According to one or more embodiments, the initial boiling point of the hydrocarbon feedstock is above 120° C. For example, the hydrocarbon feedstock may be chosen from the following feedstocks: atmospheric distillates, vacuum distillates, atmospheric or vacuum residues or effluents from a Fischer-Tropsch unit. Preferably, the hydrocarbon feedstock is chosen from the following feedstocks: atmospheric distillate (naphtha, petroleum, kerosene and gas oils), vacuum distillate, for example gas oils, resulting from the direct distillation of the crude oil or from conversion unit such as an FCC (fluid catalytic cracking unit), a coker or a visbreaking unit, LCO (light cycle oil) resulting from a catalytic cracking unit, feedstocks originating from units for extracting aromatics, lubricating oil bases or bases resulting from solvent dewaxing of a lubricating oil bases, distillates originating from fixed-bed or bubbling-bed processes for the desulphurisation or hydroconversion of ATRs (atmospheric residues) and/or of VRs (vacuum residues) and/or of deasphalted oils, deasphalted oils, effluents from a Fischer-Tropsch unit, plant oils, alone or as a mixture, or animal fats. The above list is not limiting.

According to one or more embodiments, the hydrocarbon feedstock comprises at least 5% by weight of cracked feedstocks relative to the weight of the hydrocarbon feedstock; or the hydrocarbon feedstock comprises less than 5% by weight of cracked feedstocks relative to the weight of the hydrocarbon feedstock so that it is possible to implement a temperature rise of greater than 15° C. between the inlet and the outlet of the hydrotreatment or hydroconversion reaction section (R-1).

According to one or more embodiments, the high-pressure cold separator is operated at a pressure below the pressure of the hydrotreatment or hydroconversion reaction section.

According to one or more embodiments, the temperature of the high-pressure cold separator is between 20° C. and 100° C.

According to one or more embodiments, the high-pressure hot separator is operated at a pressure below the pressure of the hydrotreatment or hydroconversion reaction section.

According to one or more embodiments, the temperature of the high-pressure hot separator is between 200° C. and 450° C.

According to one or more embodiments, the hydrocarbon feedstock is at a temperature of between 30° C. and 110° C., preferentially between 34° C. and 100° C., at the inlet of the unit.

According to one or more embodiments, the hydrocarbon feedstock is at a temperature of between 150° C. and 280° C., preferentially between 160° C. and 260° C., at the inlet of the unit.

According to one or more embodiments, the process comprises a step of filtering the hydrocarbon feedstock at the inlet of the unit, after an optional step of heating to a temperature of between 50° C. and 100° C. or between 150° C. and 230° C. According to one or more embodiments, the process comprises a step of retaining the filtered hydrocarbon feedstock in a feedstock drum. A step of pumping said feedstock from the drum makes possible to feed the coil-wound heat exchanger S-1.

According to one or more embodiments, the temperature of the hydrocarbon feedstock and optionally of the hydrogen stream or of the hydrocarbon feedstock/hydrogen stream mixture at the outlet of the mixing section (located upstream of the coil-wound heat exchanger) and/or at the inlet of the coil-wound heat exchanger and/or at the inlet of the bypass is between 30° C. and 280° C., preferably between 34° C. and 260° C. According to one or more particularly preferred embodiments, the abovementioned temperature is between 40° C. and 60° C. (cold scheme). According to one or more particularly preferred embodiments, the abovementioned temperature is between 200° C. and 250° C. (hot scheme).

According to one or more embodiments, the temperature of the hydrocarbon feedstock and/or the hydrogen stream or the heated hydrocarbon feedstock/hydrogen stream mixture at the outlet of the coil-wound heat exchanger is between 200° C. and 460° C., preferably between 240° C. and 440° C.

According to one or more embodiments, the temperature of the heated hydrocarbon feedstock/hydrogen stream mixture at the inlet of the hydrotreatment or hydroconversion reaction section is between 200° C. and 460° C., preferably between 240° C. and 440° C.

According to one or more embodiments, the temperature of the reaction effluent at the outlet of the hydrotreatment or hydroconversion reaction section and/or at the inlet of the coil-wound heat exchanger is between 205° C. and 475° C., preferably between 245° C. and 455° C.

According to one or more embodiments, the temperature of the cooled reaction effluent at the outlet of the coil-wound heat exchanger is between 70° C. and 450° C., preferably between 80° C. and 380° C.

According to a third aspect, the aforementioned objective, and also other advantages, are obtained by a use of a coil-wound heat exchanger, said coil-wound exchanger being a single-pass heat exchanger formed by a vertical chamber in which one or more bundles of tubes are helically wound around a central core, as numerous superposed layers, in a hydrotreatment or hydroconversion process.

According to one or more embodiments, the coil-wound heat exchanger is used for:
    heating and directly distributing a hydrocarbon feedstock/hydrogen stream mixture to a hydrotreatment or hydroconversion reaction section; and
    cooling the effluent from the hydrotreatment or hydroconversion reaction section.

Embodiments of the device, of the process and of the use referred to above and also other features and advantages will become apparent on reading the description that follows, given solely by way of illustration and non-limitingly, and with reference to the following drawings.

DETAILED DESCRIPTION

The present description relates to the field of hydroconversion devices and processes, such as devices and processes for hydrocracking heavy feedstocks, for example vacuum residues or vacuum gas oil. The present description also relates to the field of hydrotreatment devices and processes, such as devices and processes for hydrodemetallization, hydrodenitrogenation and/or hydrodesulfurization of residue or of gas oil.

Figure 1:
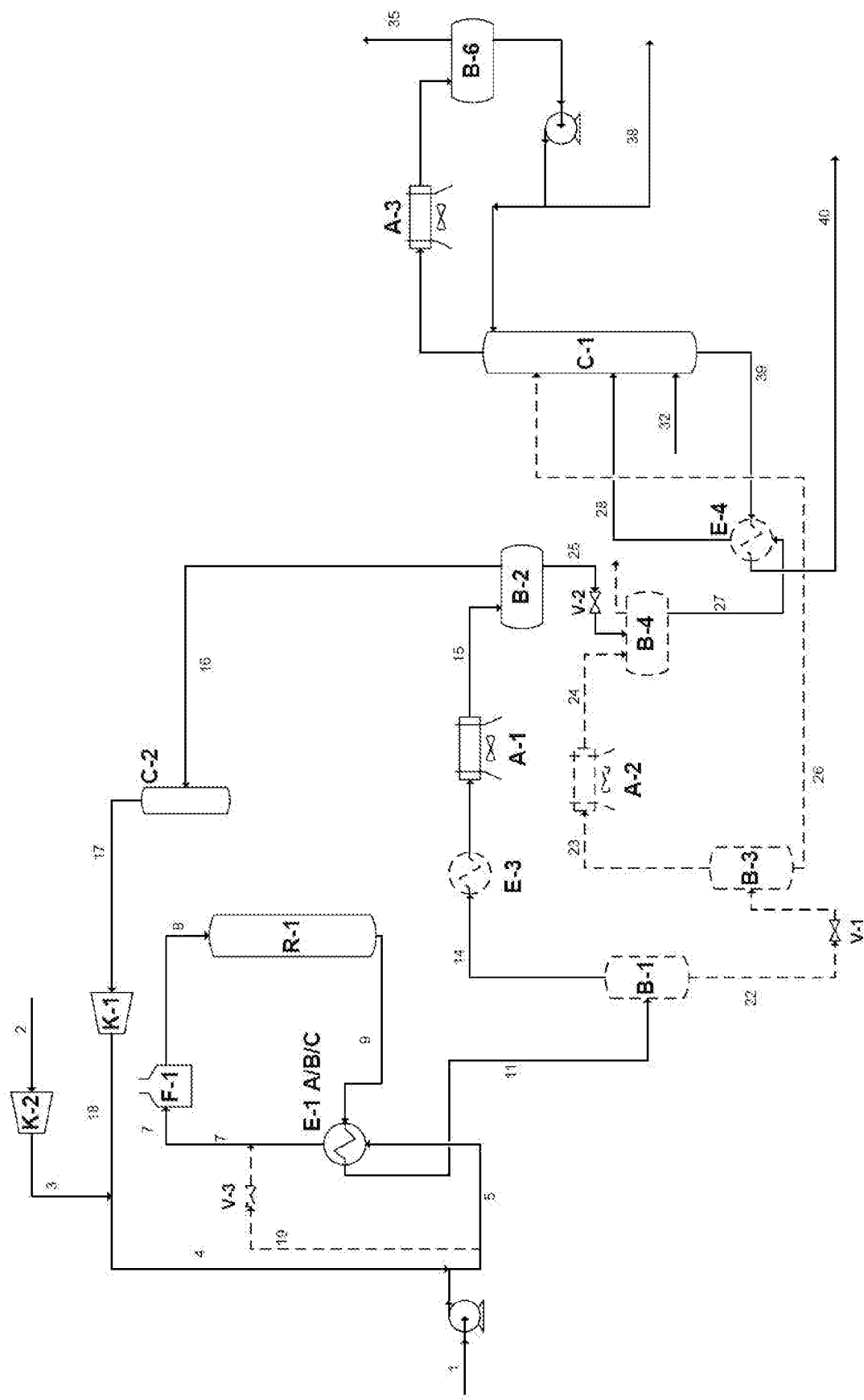
FIG. 1 depicts a layout of a reference device in which the feedstock of the reaction section is preheated by the reaction effluent in a shell and tube heat exchanger train then heated in a furnace before entering the reaction section.

With reference to FIG. 1, a reference device for hydrotreatment or hydroconversion of hydrocarbon feedstocks, such as gas oils, vacuum distillates, atmospheric or vacuum residues or effluents from a Fischer-Tropsch unit, comprises:
    a first section for mixing the hydrocarbon feedstock (line 1) and a hydrogen stream (line 4);
    one or more trains of shell and tube heat exchangers E-1A/B/C/D and E-1E/F/G/H for preheating the hydrocarbon feedstock/hydrogen stream mixture (referred to hereinafter as hydrocarbon mixture) (line 5) resulting from the first mixing section with the reaction effluent (line 9) from a hydrotreatment or hydroconversion reaction section R-1;
    a reactor inlet furnace F-1 for heating the preheated hydrocarbon mixture (line 7) resulting from the train or trains of shell and tube heat exchangers E-1 and distributing the heated hydrocarbon mixture (line 8) to the hydrotreatment or hydroconversion reaction section R-1;
    the hydrotreatment or hydroconversion reaction section R-1;
    optionally a bypass (bypass line 19) so that a portion of the hydrocarbon mixture (line 5) can avoid the train or trains of shell and tube heat exchangers E-1 and enable the reaction temperature of the hydrotreatment or hydroconversion reaction section R-1 to be adjusted;
    optionally, a high-pressure hot separator B-1, the feedstock of which is formed by the reaction effluent cooled after passing through the trains of shell and tube heat exchangers E-1 (line 11), in order to distribute a first liquid effluent comprising at least one heavy fraction (line 22) and a first gaseous effluent comprising a light fraction (line 14);
    a high-pressure cold separator B-2, the feedstock of which is formed by at least one portion of the reaction effluent resulting from the hydrotreatment or hydroconversion reaction section R-1 and cooled after passing through the train or trains of shell and tube heat exchangers E-1 (lines 11 and 14), in order to distribute a first liquid effluent comprising at least one light fraction (line 25) and a first gaseous effluent comprising hydrogen (line 16);

optionally a second heat exchanger E-3 for cooling the at least one portion of the reaction effluent (or optionally the first gaseous effluent comprising a light fraction originating from the high-pressure hot separator B-1);

optionally a first air condenser A-1 for condensing the at least one portion of the reaction effluent (or optionally the first gaseous effluent comprising a light fraction originating from the high-pressure hot separator B-1 and optionally further originating from the second heat exchanger E-3);

optionally an amine washing column C-2 that makes it possible to eliminate at least a portion of the $H_2S$ from the first gaseous effluent comprising hydrogen (line 16) resulting from the high-pressure cold separator B-2, also referred to as recycled hydrogen;

optionally a first compression section K-1 for compressing the recycled and amine-washed hydrogen (line 17);

optionally a second compression section K-2 for compressing the make-up hydrogen (line 2);

optionally a second section for mixing the recycled, washed and compressed hydrogen (line 18) and the compressed make-up hydrogen (line 3);

optionally a medium-pressure hot separator B-3, the feedstock of which is the first liquid effluent comprising at least one heavy fraction (line 22) resulting from the high-pressure hot separator B-1, and one effluent of which is a second liquid effluent comprising at least one heavy fraction (line 26) which is distributed to a separation column C-1;

optionally a second air condenser A-2 for condensing a second gaseous effluent comprising a light fraction (line 23) resulting from the medium-pressure hot separator B-3 and distributing a condensed second gaseous effluent comprising a light fraction (line 24);

optionally a medium-pressure cold separator B-4, for separating the first liquid effluent comprising at least one light fraction (line 25) resulting from the high-pressure cold separator B-2 (and optionally the second gaseous effluent comprising a light fraction (line 23) resulting from the medium-pressure hot separator B-3 (and optionally condensed (line 24) in the second air condenser A-2)), distributing a second liquid effluent comprising at least one light fraction (lines 27 and 28) to the separation column C-1, and removing a second gaseous effluent comprising hydrogen;

the separation column C-1 (e.g. conventional fractionating column or stripping column using a fluid added via the line 32) for distributing a bottoms liquid (line 39) and an overhead effluent starting from the liquid effluent (line 25) resulting from the high-pressure cold separator B-2, optionally resulting from the high-pressure hot separator B-1 (line 22), optionally resulting from the medium-pressure separator B-3 (line 26), optionally resulting from the medium-pressure cold separator B-4 (line 27);

optionally a third heat exchanger E-4 for heating the feedstock of the separation column C-1 (line 25, optionally line 27) and/or cooling the bottoms liquid from the separation column C-1 (line 39);

optionally a fourth heat exchanger (not represented) suitable for cooling or heating the first or second liquid effluent comprising at least one heavy fraction;

optionally a third air condenser A-3 for condensing the overhead effluent resulting from the separation column C-1; and optionally a reflux drum B-6 for separating the overhead effluent into a gaseous overhead fraction (e.g. sour gas) (line 35) and a hydrocarbon liquid cut (e.g. naphtha) (line 38).

Figure 2:
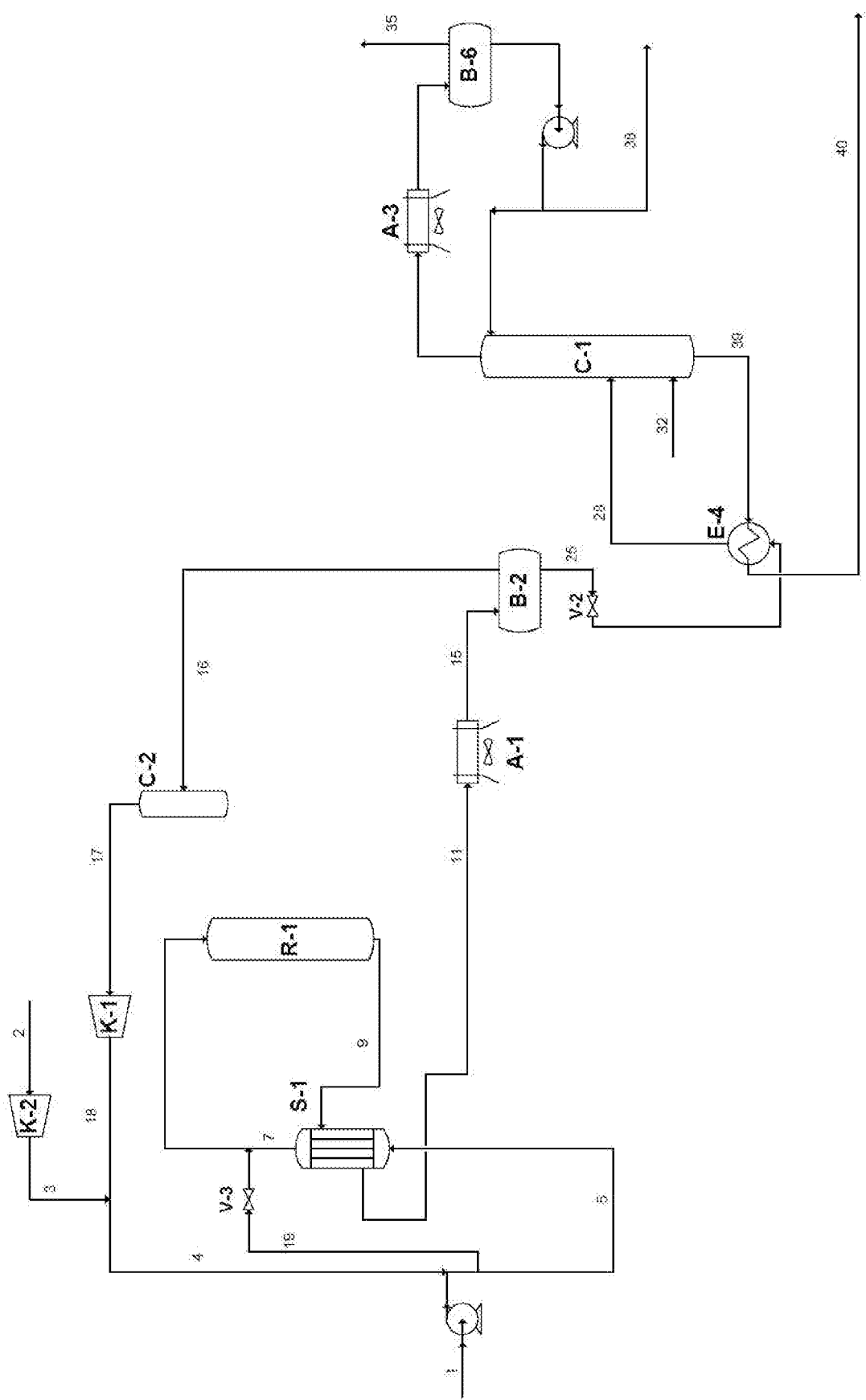
FIG. 2 depicts a layout of a device according to the present description in which the feedstock of the reaction section is heated by the reaction effluent in a coil-wound heat exchanger S-1 before entering the reaction section directly.
Figure 3:
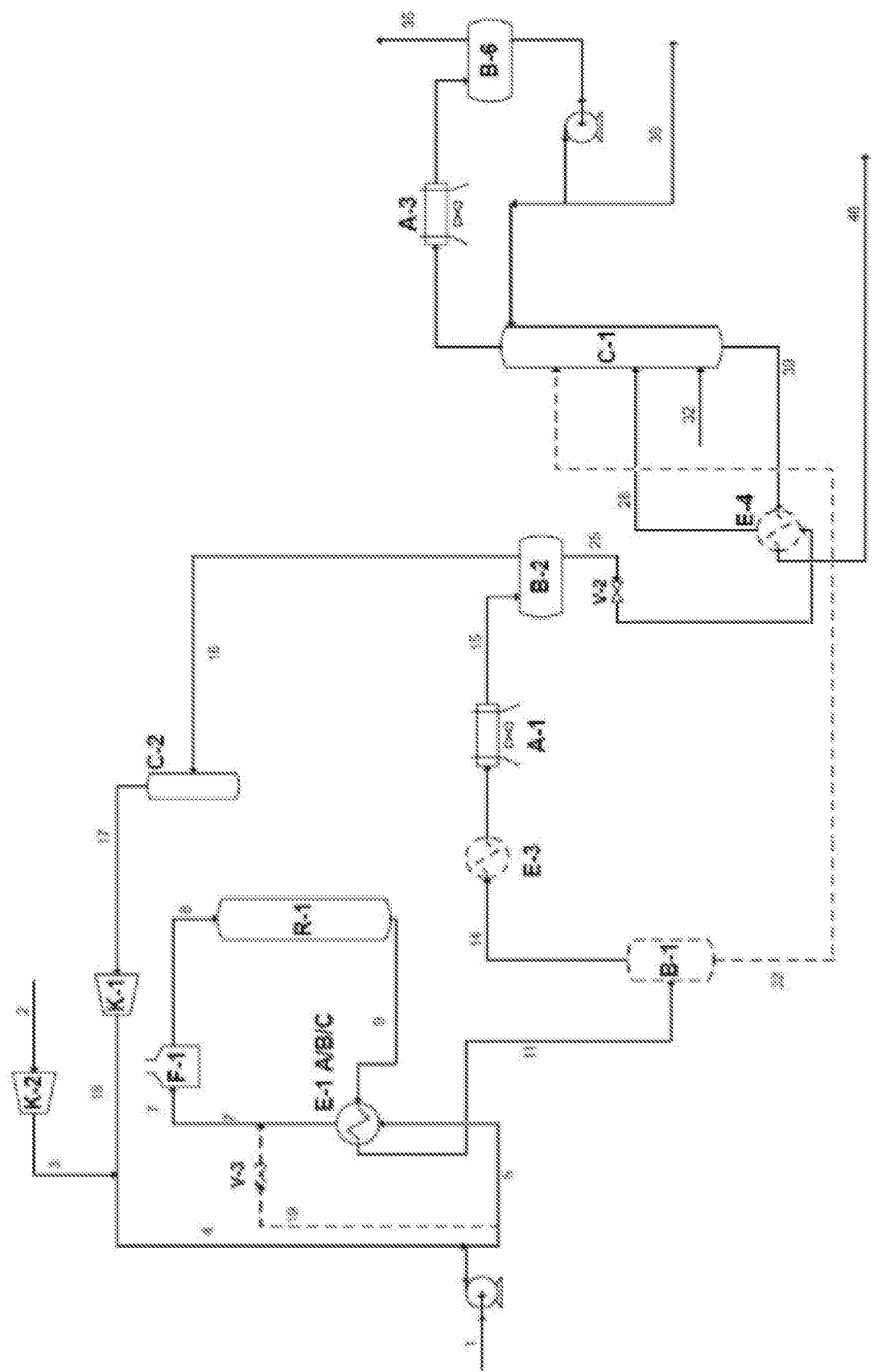

FIGS. 1 and 2 have the same numbering for the same equipment of the hydrotreatment or hydroconversion device.

With reference to FIG. 2, the device according to the first aspect of the present description comprises the elements of the reference device, with the exception of the train or trains of shell and tube heat exchangers E-1 (FIG. 1) which are replaced by at least one coil-wound heat exchanger S-1. It is also important to note that the reactor inlet furnace F-1 used in the reference device (FIG. 1) for heating the feedstock is no longer necessary in the device according to the present description. According to one or more embodiments, the feedstock of the reaction section is only heated by the reaction effluent, preferably by means of a single coil-wound heat exchanger S-1, before entering directly into the reaction section.

Specifically, we have demonstrated that a hydrotreatment or hydroconversion device comprising at least one coil-wound heat exchanger S-1, as a replacement for the train or trains of shell and tube heat exchangers E-1 for heating the feedstock of the hydrotreatment or hydroconversion reaction section R-1 with reaction effluent, makes it possible to dispense with the reactor inlet furnace F-1 provided for the heating of said feedstock.

The coil-wound heat exchanger S-1 is a single-pass heat exchanger formed by a vertical chamber in which one or more bundles of tubes are helically wound around a central core, as numerous superposed layers (see Technique de l'Ingénieur, J 3 601 V2 paragraph 4.2). Said exchanger makes it possible to exchange heat between a fluid circulating in the chamber and at least one fluid circulating in the tube bundle.

According to one or more embodiments, the coil-wound heat exchanger S-1 is used with the hot fluid on the shell side and the cold fluid on the tube side.

According to one or more embodiments, the coil-wound heat exchanger S-1 is used with the hot fluid on the tube side and the cold fluid on the shell side.

In the example from FIG. 2, the first mixing section is positioned upstream of the at least one coil-wound heat exchanger S-1. In one or more embodiments, the first mixing section lies downstream of the at least one coil-wound heat exchanger S-1.

In the example from FIG. 2, the coil-wound heat exchanger (S-1) is positioned to heat the hydrocarbon feedstock/hydrogen stream mixture. On the other hand, the coil-wound heat exchanger (S-1) may be configured to heat the hydrocarbon feedstock and optionally the hydrogen stream.

It should also be noted that the device according to the present description may comprise a start-up furnace (not represented) located at the inlet of the hydrotreatment or hydroconversion reaction section (i.e., on line 7 between S-1 and R1). On the other hand, the start-up furnace is only used for starting up the process; the process does not comprise a heating step between the coil-wound heat exchanger and the hydrotreatment or hydroconversion reaction section in stable operation.

According to one or more embodiments, the initial boiling point of the hydrocarbon feedstock is greater than 120° C. In the case of diesel, the initial point is generally around 150°

C. and the distillation range is typically between 170° C. and 390° C. In the case of atmospheric residue, the initial point is typically greater than 300° C., preferably between 340° C. and 380° C. In the case of vacuum residue, the initial point is typically between 450° C. and 600° C., preferably between 500° C. and 550° C. Light vacuum distillate (light vacuum gas oil—LVGO) is characterized by a distillation range between 300° C. and 430° C., preferably between 340° C. and 400° C. Heavy vacuum distillate (heavy vacuum gas oil—HVGO) is characterized by a distillation range between 400° C. and 620° C., preferably between 440° C. and 550° C. The usable feedstocks are therefore in a wide range of boiling points.

According to one or more embodiments, the hydrocarbon feedstock contains at least 10% by volume, generally at least 20% by volume, an often at least 80% by volume of compounds that boil above 340° C.

According to one or more embodiments, the nitrogen content of the hydrocarbon feedstock is greater than 500 ppm by weight, generally between 500 and 10 000 ppm by weight, more generally between 700 and 4500 ppm by weight and more generally still between 800 and 4500 ppm by weight.

According to one or more embodiments, the sulfur content of the hydrocarbon feedstock is between 0.01% and 5% by weight, generally between 0.2% and 4% by weight and more generally still between 0.5% and 3% by weight.

According to one or more embodiments, the hydrocarbon feedstock contains metals.

According to one or more embodiments, the combined nickel and vanadium content of the hydrocarbon feedstock is less than 10 ppm by weight, preferably less than 5 ppm by weight and more preferably still less than 2 ppm by weight.

According to one or more embodiments, the asphaltene content of the hydrocarbon feedstock is less than 3000 ppm by weight, preferably less than 1000 ppm by weight and more preferably still less than 300 ppm by weight.

According to one or more embodiments, the reaction effluent from the hydrotreatment or hydroconversion reaction section R-1 consists of a hydrocarbon cut, generally as a mixed phase, comprising hydrogen, gases resulting from the cracking, and in particular $H_2S$ and $NH_3$ resulting from the reactions of said reaction section, in proportion to the content of sulfur and nitrogen contained in the feedstock, optionally $CO_2$ and other gases, light cuts such as LPG (liquefied petroleum gas) originating from secondary reactions, and at least naphtha, and optionally the following hydrocarbon cuts: diesel, kerosene and/or unconverted residue, etc., depending on the nature of the feedstock and on the type of reaction.

According to one or more embodiments, the first liquid effluent comprising at least one heavy fraction comprises at least one portion of the heaviest fraction of the effluent from the reaction section, comprising naphtha, diesel, kerosene and/or unconverted residue depending on the nature of the feedstock and on the type of reaction. The first liquid effluent comprising at least one heavy fraction may also comprise an intermediate fraction of the effluent from the reaction section, optionally comprising diesel, kerosene and/or naphtha depending on the nature of the feedstock and on the type of reaction.

According to one or more embodiments, the first gaseous effluent comprising a light fraction comprises at least one portion of the lightest fraction of the reaction effluent, comprising hydrogen, gases resulting from the cracking, and in particular $H_2S$ and $NH_3$ resulting from the reactions of the reaction section, in proportion to the content of sulfur and nitrogen contained in the feedstock, optionally $CO_2$ and other gases, light cuts such as LPG originating from secondary reactions, and at least naphtha.

According to one or more embodiments, the first liquid effluent comprising at least one light fraction comprises a fraction of the reaction effluent comprising light cuts such as LPG originating from secondary reactions, and at least naphtha.

According to one or more embodiments, the first gaseous effluent comprising hydrogen comprises gases resulting from the cracking, and in particular $H_2S$ resulting from the reactions of the reaction section, in proportion to the content of sulfur contained in the feedstock, optionally $CO_2$.

According to one or more embodiments, the second liquid effluent comprising at least one heavy fraction comprises the heaviest fraction of the effluent from the reaction section, comprising diesel, kerosene and/or unconverted residue depending on the nature of the feedstock and on the type of reaction.

According to one or more embodiments, the second gaseous effluent comprising a light fraction comprises a first intermediate fraction of the effluent from the reaction section, optionally comprising diesel, kerosene and/or naphtha depending on the nature of the feedstock and on the type of reaction.

According to one or more embodiments, the second liquid effluent comprising at least one light fraction comprises the heaviest fraction of the first liquid effluent comprising at least one light fraction. The second liquid effluent comprising at least one light fraction may also comprise a second intermediate fraction of the effluent from the reaction section, comprising diesel, kerosene and/or naphtha depending on the nature of the feedstock and on the type of reaction.

According to one or more embodiments, the second gaseous effluent comprising hydrogen comprises at least one portion of the lightest fraction of the reaction effluent, comprising hydrogen, gases resulting from the cracking, and in particular $H_2S$ resulting from the reactions of the reaction section, in proportion to the content of sulfur contained in the feedstock, optionally $CO_2$ and other gases.

According to one or more embodiments, the overhead effluent comprises gases resulting from the cracking, and in particular $H_2S$, optionally $CO_2$ and other gases, LPGs, naphtha and optionally the stripping fluid.

According to one or more embodiments, the gaseous overhead fraction comprises gases resulting from the cracking, and in particular $H_2S$, optionally $CO_2$ and other gases, LPGs.

According to one or more embodiments, the liquid hydrocarbon cut comprises naphtha.

According to one or more embodiments, the bottoms liquid comprises the heaviest fraction of the effluent from the reaction section, comprising diesel, kerosene and/or unconverted residue depending on the nature of the feedstock and on the type of reaction.

In the device according to the present description, the hydrotreatment or hydroconversion reaction section R-1 may comprise one or more reactors arranged in series or in parallel, for example two reactors arranged in series. Each reactor of the reaction section comprises at least one catalyst bed. The catalyst may be used in a fixed bed, or in an expanded bed, or else in a bubbling bed. In the case of a catalyst used in a fixed bed, it is possible to position several catalyst beds in at least one reactor. Each reactor may be equipped with cooling means such as, for example, a liquid or gaseous quench stream located between two successive beds so as to control the temperature at the inlet of each of the beds in the reactor. On the other hand, the hydrotreatment or hydroconversion reactors are free of heating means.

According to one or more embodiments, the hydrotreatment or hydroconversion reaction section R-1 is the reaction section of a hydrocracking unit.

According to one or more embodiments, the hydrotreatment or hydroconversion reaction section R-1 is the reaction section of a unit for hydrodesulfurization of diesel and/or kerosene and/or vacuum distillate.

According to one or more embodiments, the hydrotreatment or hydroconversion reaction section R-1 is the reaction section of a unit for hydrodesulfurization of naphtha.

According to one or more embodiments, the hydrotreatment or hydroconversion reaction section R-1 is included in a unit for hydroconversion of residue or distillate or deasphalted oil in a bubbling bed.

The separation column C-1 aims in particular to eliminate the gases resulting from cracking (generally referred to as sour gases), and in particular $H_2S$ resulting from the reactions of the reaction section. This column is preferably stripped by means of any stripping gas such as for example a gas containing hydrogen or steam. Preferably steam is used to carry out said stripping.

According to the second aspect, the present description also relates to a process for implementing the device according to the first aspect.

According to one or more embodiments, the operating conditions of the hydrotreatment or hydroconversion reaction section R-1 comprise at least one of the following features:
- the temperature is between around 200° C. and around 460° C., preferentially between around 240° C. and around 450° C.;
- the total pressure is between around 1 and around 20 MPa, such as between 2 and 20 MPa, preferably between 2.5 and 18 MPa, and very preferably between 3 and 18 MPa;
- the overall hourly space velocity of liquid feedstock for each catalytic step is between around 0.05 $h^{-1}$ and around 12 $h^{-1}$, and preferably between around 0.05 $h^{-1}$ and around 10 $h^{-1}$;
- the purity of the hydrogen used is between around 50% and 100% by volume relative to the volume of the hydrogen supply (i.e., recycled hydrogen/make-up hydrogen mixture);
- the amount of hydrogen relative to the liquid hydrocarbon feedstock is between around 50 $Nm^3/m^3$ and around 2500 $Nm^3/m^3$; and
- the amount of cracked feedstock in the hydrocarbon feedstock is at least 5% by weight, preferably at least 10%, for instance between 10% and 50% by weight, relative to the weight of the hydrocarbon feedstock.

Any catalyst known to a person skilled in the art can be used in the process according to the present description, for example a catalyst comprising at least one element chosen from the elements from Group VIII of the Periodic Table (groups 8, 9 and 10 of the new Periodic Table) and optionally at least one element chosen from the elements from Group VIB of the Periodic Table (group 6 of the new Periodic Table).

Hereinafter, groups of chemical elements are given according to the CAS classification (CRC Handbook of Chemistry and Physics, published by CRC Press, Editor in Chief D. R. Lide, 81$^{st}$ edition, 2000-2001). For example, group VIII according to the CAS classification corresponds to the metals from columns 8, 9 and 10 according to the new IUPAC classification; group VIb according to the CAS classification corresponds to the metals from column 6 according to the new IUPAC classification.

For the implementation of the process according to the present description, it is possible to use a conventional hydroconversion catalyst comprising, on an amorphous support, at least one metal or metal compound having a hydrogenating-dehydrogenating function. This catalyst may be a catalyst comprising metals from group VIII, for example nickel and/or cobalt, often in combination with at least one metal from group VIB, for example molybdenum and/or tungsten. Use may, for example, be made of a catalyst comprising from 0.5% to 10% by weight of nickel (expressed as nickel oxide NiO) and from 1% to 30% by weight of molybdenum, preferably from 5% to 20% by weight of molybdenum (expressed as molybdenum oxide $MoO_3$) relative to the total weight of the catalyst, on an amorphous mineral support. The total content of oxides of metals from groups VIB and VIII in the catalyst is generally between 5% and 40% by weight and preferentially between 7% and 30% by weight relative to the total weight of the catalyst. The weight ratio (expressed on the basis of the metal oxides) between metal(s) from group VIB and metal(s) from group VIII is, in general, from around 20 to around 1, and usually from around 10 to around 2. The support is, for example, selected from the group formed by alumina, silica, silica-aluminas, magnesia, clays and mixtures of at least two of these minerals. This support may also contain other compounds and for example oxides chosen from boron oxide, zirconia, titanium oxide, phosphoric anhydride.

Another type of catalyst that can be used is a catalyst containing at least one matrix, at least one Y zeolite and at least one hydrogenating-dehydrogenating metal. The matrices, metals and additional elements described above may also be incorporated in the composition of this catalyst. Advantageous Y zeolites are described in patent application WO 00/71641, and also patents EP 0 911 077, U.S. Pat. Nos. 4,738,940 and 4,738,941.

According to one or more embodiments, the high-pressure cold separator B-2 is operated at a pressure lower than that of the hydrotreatment or hydroconversion reaction section R-1 or of the high-pressure hot separator B-1, for example a pressure 0.1 MPa to 1.0 MPa lower than that of the hydrotreatment or hydroconversion reaction section R-1 or of the high-pressure hot separator B-1.

The temperature of the high-pressure cold separator B-2 is generally as low as possible considering the available cooling means. This is in order to maximize the purity of the recycled hydrogen. The temperature of the high-pressure cold separator B-2 is generally between 20° C. and 100° C., preferably between 35° C. and 70° C. The first liquid effluent comprising at least one light fraction resulting from the high-pressure cold separator B-2 is sent to the separation column C-1, preferably of stripper type, preferably equipped with the reflux drum B-6.

According to one or more embodiments, the cooled reaction effluent is sent to the optional high-pressure hot separator B-1 operated at a lower pressure, for example a pressure 0.1 MPa to 1.0 MPa lower than that of the hydrotreatment or hydroconversion reaction section R-1. The temperature of the high-pressure hot separator B-1 is generally between 200° C. and 450° C., preferably between 250° C. and 380° C. and very preferably between 260° C. and 360° C.

According to one or more embodiments, the first liquid effluent comprising at least one heavy fraction resulting from the high-pressure hot separator B-1 is sent to a first valve V-1 or an optional turbine and sent to the optional medium pressure hot separator B-3, the pressure of which is chosen so as to be able to feed the optional medium-pressure cold separator B-4 with the second liquid effluent comprising at least one heavy fraction resulting from the medium-pressure hot separator B-3.

According to one or more embodiments, the medium-pressure hot separator B-3 is operated at a pressure of between 1.0 and 4.0 MPa, preferably between 1.5 and 3.5 MPa. The temperature of the medium-pressure hot separator B-3 is generally between 150° C. and 380° C., preferably between 200° C. and 360° C.

According to one or more embodiments, the first liquid effluent comprising at least one light fraction resulting from the high-pressure cold separator B-2 is expanded in a second valve V-2 or an optional turbine and sent to the optional medium-pressure cold separator B-4. The total pressure of the medium-pressure cold separator B-4 is preferentially that required to effectively recover the hydrogen within the second gaseous effluent comprising hydrogen separated in said separator B-4. This recovery of hydrogen is preferably carried out in a pressure swing adsorption unit. The total pressure of the medium-pressure cold separator B-4 is generally between 1.0 MPa and 4.0 MPa, preferably between 1.5 MPa and 3.5 MPa. The temperature of the medium-pressure cold separator B-4 is generally between 20° C. and 100° C., preferably between 35° C. and 70° C.

The bottoms liquid (line 39) from the separation column C-1 may be cooled by the third heat exchanger E-4 before being sent via the line 40 to a fractionating section (not represented) which makes it possible to separate naphtha, kerosene and gas oil cuts and a residue.

The process according to the present description is particularly suitable for feedstocks comprising at least 5% by weight, preferably at least 10% by weight of cracked feedstocks relative to the total weight of the hydrocarbon feedstock, i.e. originating from a thermal or catalytic cracking unit. Typically, the cracked feedstocks originate from a visbreaking, coking or FCC unit. According to one or more embodiments, the cracked feedstocks originate from a catalytic cracking unit, and comprise LCO (light cycle oil) or HCO (heavy cycle oil) produced for example by an FCC unit. According to one or more embodiments, said cracked feedstocks contain olefins and their bromine index is typically between 4 and 20 mg/100 g, preferentially between 7 and 20 mg/100 g measured according to the ASTM D2710 method. The process is also suitable for feedstocks comprising little or no cracked feedstocks, for example when the reactions in the reaction section are sufficiently exothermic so that it is possible to operate with a temperature of the effluents at the outlet of the reaction section which is at least 5° C., preferably at least 15° C., greater than the temperature of the feedstock at the inlet of the reaction section.

The process according to the present description is also suitable for feedstocks comprising less than 5% by weight of cracked feedstocks relative to the total weight of the hydrocarbon feedstock and also for feedstocks comprising no cracked feedstock (e.g. less than 1% by weight). For example, the process may be carried out so that the temperature rise between the inlet and the outlet of the reaction section is greater than 15° C.

According to the third aspect, the present description also relates to a use of the coil-wound heat exchanger S-1 in a device according to the first aspect or a process according to the second aspect, and in particular for heating and directly distributing the hydrocarbon mixture to the hydrotreatment or hydroconversion reaction section R-1; and cooling the effluent from the hydrotreatment or hydroconversion reaction section R-1.

The device, the process and the use according to the present description have the following advantages:

the coil-wound heat exchanger S-1 and optionally the presence of a cracked feedstock in the hydrocarbon feedstock (since a cracked feedstock generates an increase in the temperature in the reaction section, the reaction effluent is higher in temperature at the inlet of the coil-wound exchanger), make it possible to heat the hydrocarbon mixture to a temperature high enough to be able to eliminate the reactor inlet furnace F-1 of the hydrotreatment or hydroconversion reaction section R-1 in normal operation;

the coil-wound heat exchanger S-1 makes it possible to cool the reaction effluent to a lower temperature than in the reference device and consequently the power of the first air condenser A-1 that is required is lower;

the coil-wound heat exchanger S-1 makes it possible to reduce the floor area needed for the installation of the equipment of the device;

the coil-wound heat exchanger S-1 makes it possible to reduce the pressure drop in the reaction loop and consequently to reduce the power required in the first compression section K-1.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 17/62.993, filed Dec. 22, 2017, are incorporated by reference herein.

EXAMPLES

FIG. 1 constitutes a reference comparison and FIG. 2 describes an example of an embodiment of the device and process according to the present description.

The hydrocarbon feedstock is a cut having boiling points between 187° C. and 365° C., mixed with 61% by weight of atmospheric gas oil, with 11% by weight of heavy vacuum distillates, with 14% by weight of cracked gas oil and with 14% by weight of coker gas oil relative to the total weight of the hydrocarbon feedstock, and having the following characteristics:

| Specific gravity | | 0.871 |
|---|---|---|
| Sulfur content | % by weight | 0.17% |
| Nitrogen content | ppm by weight | 641 |

In the present application the specific gravity of the hydrocarbon feedstock is dimensionless.

According to the present description, as represented in FIG. 2, the hydrocarbon feedstock is fed via the line 1. The make-up hydrogen, preferably in excess relative to the hydrocarbon feedstock, is fed via the line 2 and the second compression section K-2 (e.g. compressor) then the line 3, and mixed with the recycled hydrogen in line 4. The hydrogen is then mixed with the hydrocarbon feedstock (line 1) before distributing the hydrocarbon mixture thus obtained to the coil-wound heat exchanger S-1 via the line 5. The coil-wound heat exchanger S-1 makes it possible to heat the hydrocarbon mixture by means of the reaction effluent. In this example, the coil-wound heat exchanger S-1 is as described in patent application WO 2014/067223. After this heat exchange, the hydrocarbon mixture is conveyed via the line 7 directly to a hydrodesulfurization section, formed by at least one hydrodesulfurization reactor (an example of a hydrotreatment or hydroconversion reaction section R-1) comprising at least one hydrodesulfurization catalyst. The temperature necessary for the hydrodesulfurization reaction is adjusted by bypassing a portion of the hydrocarbon mixture via the line 19 (optionally by means of a valve V-3).

In this example, the hydrotreatment or hydroconversion reaction section R-1 is composed of a hydrodesulfurization reactor with 3 catalyst beds. The beds of the hydrodesulfurization reactor are constituted of Axens HR1248 catalyst (of NiMo on $Al_2O_3$ type). The beds are operated approximately at 7.50 MPa and at temperatures between 325° C. and 390° C. The chemical hydrogen consumption in the reaction section is 1.1% by weight relative to the fresh hydrocarbon feedstock.

The reaction effluent is then sent to the coil-wound heat exchanger S-1 via the line 9 then to the first air condenser A-1 via the line 11 before entering via the line 15 the high-pressure cold separator B-2 making it possible both to carry out a gas-liquid separation and a decantation of an aqueous liquid phase.

The first liquid effluent comprising at least one light fraction resulting from the high-pressure cold separator B-2 feeds the third heat exchanger E-4 via the line 25 and the stripper (an example of a separation column C-1) via the line 28. The stripper is operated at 0.69 MPa at the top of the column.

The recycled hydrogen resulting from the high-pressure cold separator B-2 is sent via the line 16 to the amine washing column C-2 that makes it possible to eliminate at least one portion of the $H_2S$. The recycled hydrogen is then distributed via the lines 17 and 18 to the first mixing section then to the hydrotreatment reactor with the hydrocarbon feedstock, after compression by means of the first compression section K-1 and mixing with the feedstock (line 1).

The stripper is fed with stripping steam via the line 32. At the top of the stripper, the gaseous fraction of the overhead effluent is recovered (generally referred to as sour gas) via the line 35, and a naphtha-type cut is recovered via the line 38 that has a final boiling point usually greater than 100° C. The bottoms liquid from the stripper, recovered via the line 39, is cooled in the third heat exchanger E-4 before being sent via the line 40 to an optional fractionating section (not represented) which makes it possible to recover naphtha, kerosene, gas oil cuts and a residue.

Table 1 compares:
a reference hydrotreatment device and process using a train of three feedstock/effluent shell and tube heat exchangers E-1A/B/C of the TEMA BEU standard (FIG. 1) and using a reactor inlet furnace F-1; and
a hydrotreatment device and process according to the present description using a single coil-wound heat exchanger S-1 (FIG. 2) and not using any reactor inlet furnace F-1.

The reference process is operated with the same feedstock and the same operating conditions as those described above for the example of the process according to the present description.

TABLE 1

| | Comparison (FIG. 1) | Example (FIG. 2) |
|---|---|---|
| Temperature (° C.) of the hydrocarbon mixture at the inlet of E-1/S-1 (Line 5) | 56 | 56 |
| Temperature (° C.) of the hydrocarbon mixture at the outlet of E-1/S-1 (Line 7) | 337 | 385 |
| Temperature (° C.) of the reaction effluent at the inlet of E-1/S-1 (Line 9) | 390 | 390 |
| Temperature (° C.) of the reaction effluent at the outlet of E-1/S-1 (Line 11) | 176 | 138 |
| Power (MW) of the reactor inlet furnace F-1 | 11.9 | 0 |
| Power (MW) of the first air condenser A-1 | 36.3 | 24.2 |
| Total power (MW) of the reactor inlet furnace and of the first air condenser | 48.2 | 24.2 |
| Power (kW) of the first compression section K-1 | 1780 | 1400 |

As demonstrated in Table 1, in the device and process according to the present description:
the reactor inlet furnace F-1 is unnecessary whereas it is essential for the reference device and process;
the power of the first air condenser A-1 is divided by 1.5 relative to the reference device and process;
the total power of the reactor inlet furnace F-1 and of the first air condenser A-1 is divided by 2 relative to the reference device and process; and
the power of the first compression section K-1 is divided by 1.3 relative to the reference device and process The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A device for hydroconversion or hydrotreatment of a hydrocarbon feedstock, comprising:
at least one coil-wound heat exchanger (S-1), said coil-wound exchanger being a single-pass heat exchanger formed by a vertical chamber in which one or more bundles of tubes are helically wound around a central core, as numerous superposed layers, suitable for:
heating and directly distributing the hydrocarbon feedstock and optionally a hydrogen stream or a hydrocarbon feedstock/hydrogen stream mixture to a hydrotreatment or hydroconversion reaction section (R-1) forming a reaction effluent, and
cooling the reaction effluent from the hydrotreatment or hydroconversion reaction section (R-1) forming a cooled reaction effluent;
a bypass (19) suitable for directly distributing a portion of the hydrocarbon feedstock or a portion of the hydrocarbon feedstock/hydrogen stream mixture from the inlet of the coil-wound heat exchanger (S-1) to the outlet of the coil-wound heat exchanger (S-1);
the hydrotreatment or hydroconversion reaction section (R-1) suitable for hydrotreating or hydroconverting the hydrocarbon feedstock;
a high-pressure cold separator (B-2) suitable for separating at least one portion of the cooled reaction effluent into a first liquid effluent comprising at least one light fraction and a first gaseous effluent comprising hydrogen; and a separation column (C-1) suitable for separating the first liquid effluent comprising at least one light fraction into a bottoms liquid and an overhead effluent; or instead of the separation column (C-1) suitable for separating the first liquid effluent comprising at least one light fraction, a medium-pressure cold separator (B-4) suitable for separating the first liquid effluent comprising at least one light fraction into a second liquid effluent comprising at least one light fraction distributed to the separation column (C-1), and a second gaseous effluent comprising hydrogen.

2. The hydroconversion or hydrotreatment device according to claim 1, comprising a single coil-wound heat exchanger (S-1).

3. The hydroconversion or hydrotreatment device according to claim 1, further comprising a high-pressure hot separator (B-1) suitable for separating the cooled reaction effluent into a first liquid effluent comprising at least one heavy fraction and a first gaseous effluent comprising a light fraction distributed to the high-pressure cold separator (B-2).

4. The hydroconversion or hydrotreatment device according to claim 3, further comprising a medium-pressure hot separator (B-3) suitable for separating the first liquid effluent comprising at least one heavy fraction into a second liquid effluent comprising at least one heavy fraction distributed to the separation column (C-1), and a second gaseous effluent comprising a light fraction.

5. The hydroconversion or hydrotreatment device according to claim 4, further comprising a medium-pressure cold separator (B-4) suitable for separating the first liquid effluent comprising at least one light fraction into a second liquid effluent comprising at least one light fraction distributed to the separation column (C-1), and a second gaseous effluent comprising hydrogen.

6. The hydroconversion or hydrotreatment device according to claim 5, in which the medium-pressure cold separator (B-4) is suitable for separating the second gaseous effluent comprising a light fraction.

7. The hydroconversion or hydrotreatment device according to claim 1, further comprising a medium-pressure cold separator (B-4) suitable for separating the first liquid effluent comprising at least one light fraction into a second liquid effluent comprising at least one light fraction distributed to the separation column (C-1), and a second gaseous effluent comprising hydrogen.

8. A process for hydroconversion or hydrotreatment of a hydrocarbon feedstock, comprising the following steps:

heating and directly distributing a portion I of the hydrocarbon feedstock and optionally a hydrogen stream or a portion I' of a hydrocarbon feedstock/hydrogen stream mixture to a hydrotreatment or hydroconversion reaction section (R-1) by at least one coil-wound heat exchanger (S-1) forming a reaction effluent;

directly distributing a portion II of the hydrocarbon feedstock or a portion II' of the hydrocarbon feedstock/hydrogen stream mixture from the inlet of the coil-wound heat exchanger (S-1) to the outlet of the coil-wound heat exchanger (S-1) through a bypass (19);

mixing the hydrocarbon feedstock with the hydrogen stream, said mixing taking place before or after the heating step;

cooling the reaction effluent from the hydrotreatment or hydroconversion reaction section (R-1) by the at least one coil-wound heat exchanger (S-1) forming a cooled reaction effluent, said coil-wound exchanger being a single-pass heat exchanger formed by a vertical chamber in which one or more bundles of tubes are helically wound around a central core, as numerous superposed layers;

hydrotreating or hydroconverting the hydrocarbon feedstock in the hydrotreatment or hydroconversion reaction section (R-1) comprising at least one reactor comprising at least one catalyst comprising at least one element chosen from elements from Group VIII of the Periodic Table;

separating at least one portion of the cooled reaction effluent in a high-pressure cold separator (B-2) in order to distribute a first liquid effluent comprising at least one light fraction and a first gaseous effluent comprising hydrogen; and separating the first liquid effluent comprising at least one light fraction in a separation column (C-1) in order to distribute a bottoms liquid and an overhead effluent; or instead of separating the first liquid effluent comprising at least one light fraction in column (C-1), separating the first liquid effluent comprising at least one light fraction in a medium-pressure cold separator (B-4) into a second liquid effluent comprising at least one light fraction distributed to the separation column (C-1), and a second gaseous effluent comprising hydrogen.

9. The hydroconversion or hydrotreatment process according to claim 8, in which the hydrotreatment or hydroconversion of the hydrocarbon feedstock is carried out with at least one of the following operating conditions:

the temperature is between around 200° C. and around 460° C.;

the total pressure is between around 1 MPa and around 20 MPa;

the overall hourly space velocity of liquid feedstock is between around 0.05 h$^{-1}$ and around 12 $^{-1}$;

the hydrogen stream comprises between around 50 vol % and around 100 vol % of hydrogen relative to the volume of the hydrogen stream;

the amount of hydrogen relative to the liquid hydrocarbon feedstock is between around 50 Nm$^3$/m$^3$ and around 2500 Nm$^3$/m$^3$.

10. The hydroconversion or hydrotreatment process according to claim 8, in which the hydrocarbon feedstock comprises an initial boiling point of greater than 120° C.

11. The hydroconversion or hydrotreatment process according to claim 8, in which:

the hydrocarbon feedstock comprises at least 5% by weight of cracked feedstocks originating from visbreaking, coking, or fluid catalytic cracking relative to the weight of the hydrocarbon feedstock; or the hydrocarbon feedstock comprises less than 5% by weight of cracked feedstocks relative to the weight of the hydrocarbon feedstock, and in which a temperature rise of greater than 15° C. is implemented between the inlet and the outlet of the hydrotreatment or hydroconversion reaction section (R-1).

12. The hydroconversion or hydrotreatment process according to claim 8, in which the high-pressure cold separator (B-2) is operated at a pressure below the pressure of the hydrotreatment or hydroconversion reaction section (R-1).

13. The hydroconversion or hydrotreatment process according to claim 8, in which the temperature of the high-pressure cold separator (B-2) is between 20° C. and 100° C.

14. A process for hydroconversion or hydrotreatment of a hydrocarbon feedstock, comprising performing a heat exchange operation on a portion I of the hydrocarbon feedstock and optionally a hydrogen stream or a portion I' of a hydrocarbon feedstock/hydrogen stream mixture by a coil-wound heat exchanger (S-1), said coil-wound exchanger being a single-pass heat exchanger formed by a vertical chamber in which one or more bundles of tubes are helically wound around a central core, as numerous superposed layers, and directly distributing a portion II of the hydrocarbon feedstock or a portion II' of the hydrocarbon feedstock/hydrogen stream mixture from the inlet of the coil-wound heat exchanger (S-1) to the outlet of the coil-wound heat exchanger (S-1) through a bypass (19), and hydrotreating or hydroconverting the hydrocarbon feedstock.

15. The process according to claim 14, in which the coil-wound heat exchanger (S-1) performs:

heating and directly distributing a hydrocarbon feedstock/hydrogen stream mixture to a hydrotreatment or hydroconversion reaction section (R-1); and cooling the effluent from the hydrotreatment or hydroconversion reaction section (R-1).

* * * * *